(12) United States Patent
Hyde et al.

(10) Patent No.: US 7,882,117 B1
(45) Date of Patent: Feb. 1, 2011

(54) FIRST NORMAL FORM (1NF) DATA NORMALIZER

(75) Inventors: Caleb Sisson Hyde, Overland Park, KS (US); Kanglung Wong, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1078 days.

(21) Appl. No.: 11/612,519

(22) Filed: Dec. 19, 2006

(51) Int. Cl.
*G06F 17/30* (2006.01)
(52) U.S. Cl. .................. 707/756; 707/755; 707/758
(58) Field of Classification Search .......... 707/756
See application file for complete search history.

(56) References Cited

U.S. PATENT DOCUMENTS

| | | | |
|---|---|---|---|
| 7,788,213 B2* | 8/2010 | Friedlander et al. | 707/600 |
| 2010/0235371 A1* | 9/2010 | Bland et al. | 707/756 |

* cited by examiner

*Primary Examiner*—Apu M Mofiz
*Assistant Examiner*—Monica M Pyo

(57) ABSTRACT

An embodiment of the invention provides for receiving a data-value-location indication from which a set of data values that are to be normalized can be determined, determining column-header and row-header information associated with the set of data values, and automatically creating a set of associations, wherein, for each data value in the set of data values, each association associates respective column-header and row-header information with a single data value such that no data is duplicated per row of a table that is composed of rows of data created from the associations.

18 Claims, 10 Drawing Sheets

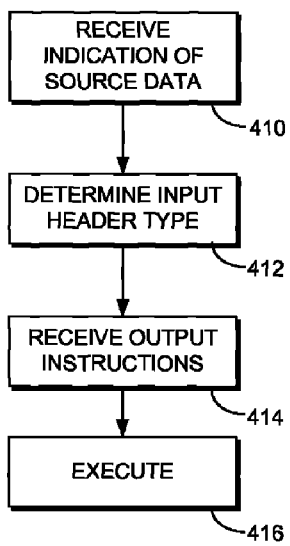
*FIG. 4.*
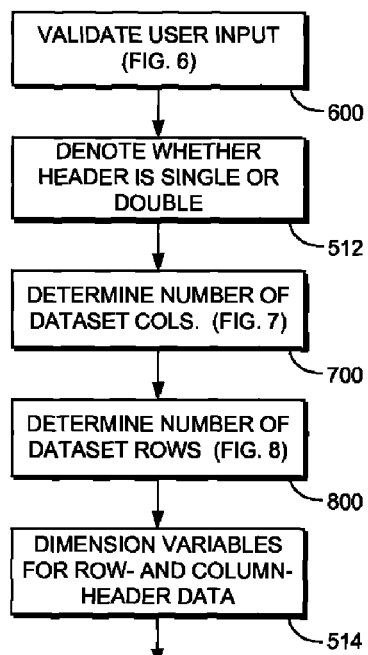
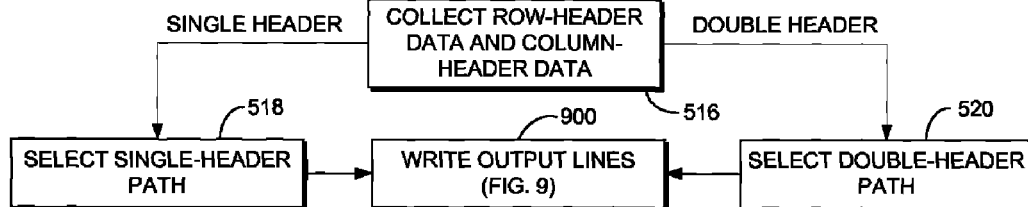
*FIG. 5.*

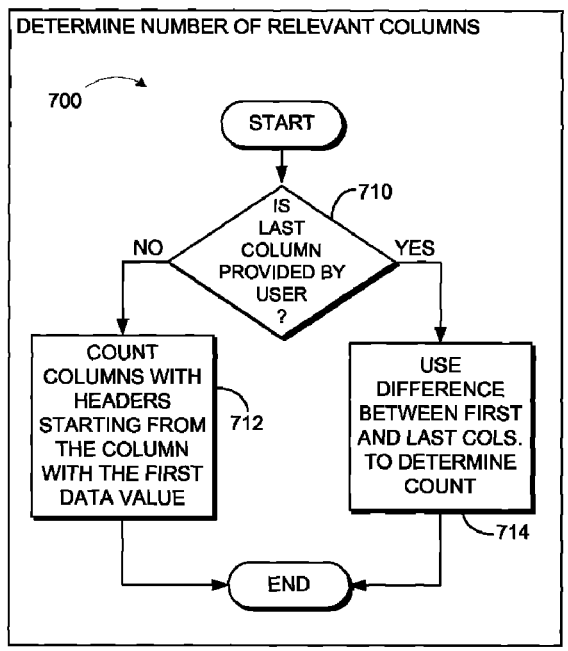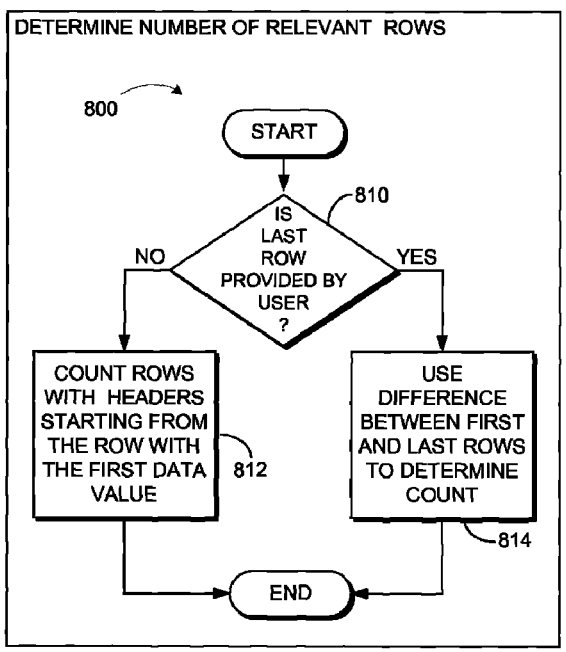
*FIG. 7.*  *FIG. 8.*

ORIGINAL TABLE (TWO HEADER ROWS) ←—1110

| | | Actual | Actual | Trend | Trend |
|---|---|---|---|---|---|
| First Name | Last Name | 1/1/2006 | 2/1/2006 | 3/1/2006 | 4/1/2006 |
| John | Smith | 1000 | 1020 | 1030 | 1045 |
| James | Key | 1500 | 1520 | 1540 | |
| Jason | Tyler | 2500 | 2300 | 2350 | 2459 |
| Lee | Tommy | 890 | 870 | 850 | 900 |

⎬—1114

SAME DATA, 1NF NORMALIZED ←—1112

| First Name | Last Name | Header 1 | Header 2 | Value |
|---|---|---|---|---|
| John | Smith | Actual | 1/1/2006 | 1000 |
| John | Smith | Actual | 2/1/2006 | 1020 |
| John | Smith | Trend | 3/1/2006 | 1030 |
| John | Smith | Trend | 4/1/2006 | 1045 |
| James | Key | Actual | 1/1/2006 | 1500 |
| James | Key | Actual | 2/1/2006 | 1520 |
| James | Key | Trend | 3/1/2006 | 1540 |
| James | Key | Trend | 4/1/2006 | |
| Jason | Tyler | Actual | 1/1/2006 | 2500 |
| Jason | Tyler | Actual | 2/1/2006 | 2300 |
| Jason | Tyler | Trend | 3/1/2006 | 2350 |
| Jason | Tyler | Trend | 4/1/2006 | 2459 |
| Lee | Tommy | Actual | 1/1/2006 | 890 |
| Lee | Tommy | Actual | 2/1/2006 | 870 |
| Lee | Tommy | Trend | 3/1/2006 | 850 |
| Lee | Tommy | Trend | 4/1/2006 | 900 |

1116 → (John Smith Actual 1/1/2006 1000 row)
1118 → (James Key Trend 4/1/2006 row)

*FIG. 11.*

FIRST NORMAL FORM (1NF) DATA NORMALIZER

INTRODUCTION

Databases can be more efficiently designed when data conforms to what is known in the art as "first normal form" or "1NF" for short. But users often fail to initially input their data into first normal form. Moreover, transforming data that is not in first normal form into a format consistent with 1NF is often time-consuming and laborious. The current state of the art could be improved by providing, among other things, methods for automatically converting data that is not in 1NF format into 1NF format.

SUMMARY

The presenting invention is defined by the claims below. Embodiments of the present invention solve at least the above problems by providing a system and method for, among other things, automatically converting data that is not formatted in first normal form into data that is normalized into first normal form. The present invention has several practical applications in the technical arts including reducing time, resources, and errors associated with preparing data to be inputted into a database, or creating a database itself in the form of a collection of records that is in first normal form.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein:

FIG. 4 depicts a flow chart that represents a high-level overview of a process for converting a format of a dataset into first normal form according to an embodiment of the present invention;

FIG. 5 is a flow diagram that depicts in greater detail illustrative steps associated with converting a format of a dataset into first normal form according to an embodiment of the present invention;

FIG. 7 depicts an illustrative process for determining the number of relevant columns in a dataset that is to be converted into one having a first normal form format according to an embodiment of the present invention;

FIG. 8 depicts an illustrative process for determining the number of rows of a dataset whose format is to be converted into first normal form according to an embodiment of the present invention;

FIG. 11 depicts a transformation from a table having two header rows and initially not in first normal form into a 1NF table according to an embodiment of the present invention.

DETAILED DESCRIPTION

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

1NF First Normal Form

Further, various technical terms are used throughout this description. A definition of such terms can be found in *Newton's Telecom Dictionary* by H. Newton, $22^{nd}$ Edition (2006). These definitions are intended to provide a clearer understanding of the ideas disclosed herein but are not intended to limit the scope of the present invention. The definitions and terms should be interpreted broadly and liberally to the extent allowed the meaning of the words offered in the above-cited reference.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
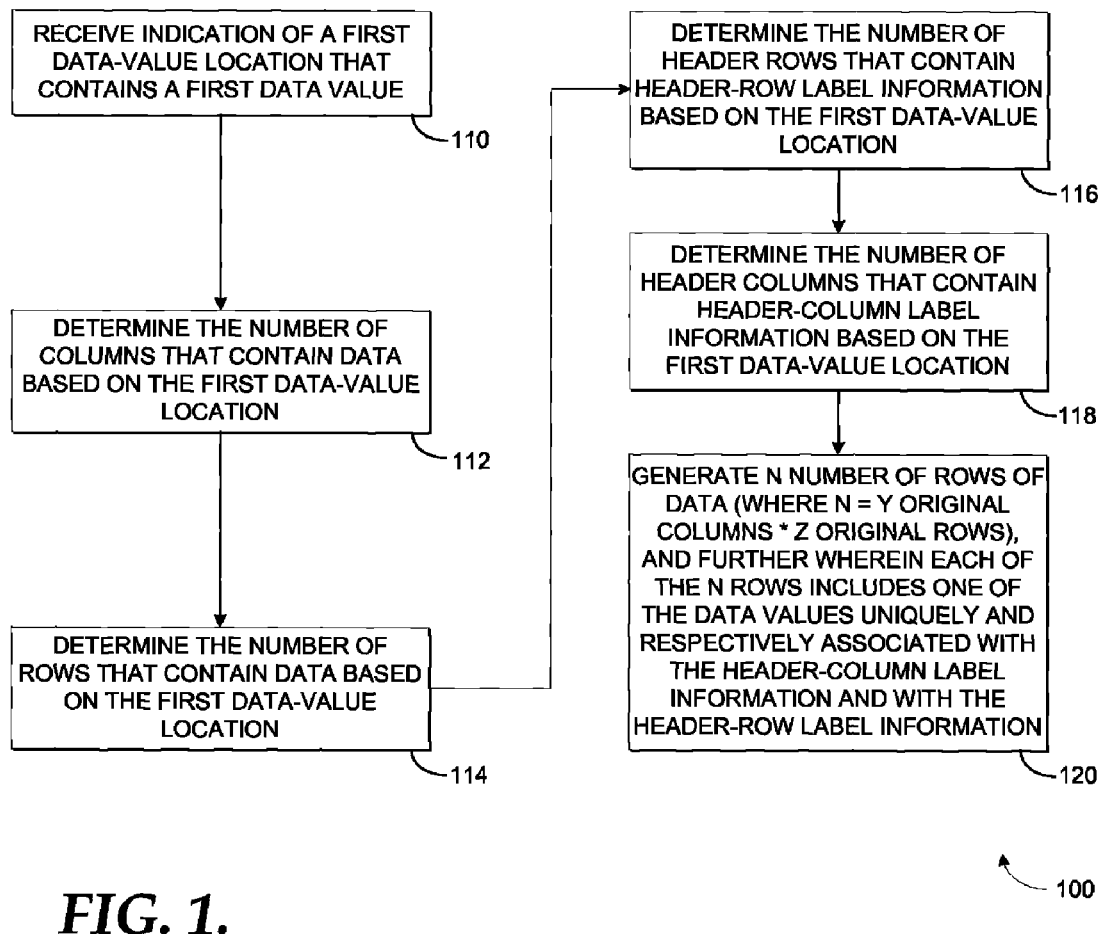
FIGS. 1-3 are illustrative embodiments of a method for converting data whose format is not first normal form into a dataset whose format is in first normal form according to embodiments of the present invention.

As previously mentioned, one embodiment of the present invention provides a method for manipulating one or more memories of a computing device that originally contain a dataset of multiple values per row in an array having, for example, Y rows and Z columns into one or more memories of a computing device that store a single value per row in an array having Y*Z rows. Turning now to FIG. 1, an illustrative embodiment of such a method is provided and referenced generally by the numeral 100. At a step 110, an indication is received of a first data value location that contains a first data value. Eventually, FIG. 10 will be used to describe a process in greater detail, but we will refer to it now to help explain this process. Thus, a first data-value of step 110 may be the data value "10" of Table 1010 in FIG. 10. In step 110, the location of the data value "10" is received. This indication may take the form of a designation of a row and a column associated with the first data value. Thus, the row and column associated with the data-value "10" will be received. As will be discussed in greater detail below, in one embodiment, this location indication can be provided by a user.

At a step 112, the number of columns is determined that contain data based on the first data value location. Referencing again Table 1010 of FIG. 10, the number of columns that contain data may be accomplished by counting the number of columns that contain header information starting with the column that includes the data-value-location indication of step 110. In this case, the number of relevant columns will be 6. This process will be discussed in greater detail below.

At a step 114, a determination is made as to the number of rows that contain data. This determination is based on the first data-value location of step 110. In the case of Table 1010, the number of rows that includes data is 4. Although not necessarily a separate step, this process is illustratively shown by reference numeral 116 which recites that one way of determining the number of rows that contain data to be normalized is to count or otherwise determine the number of header rows that contain header-row label information starting at the row containing the first data value. As applied to Table 1010, this would include counting 4 rows; namely, those rows starting with the row containing the numeral "10" and would include that row plus 3 others for a total of 4. Moreover, step 116 allows a determination to be made as to the number of header rows that contain header-label information. Tables may include multiple rows of header information.

Similarly, at a step 118, a determination is made as to the number of header columns that contain header-column label information. This determination is made based on the first data-value location of step 110. This process will be discussed in greater detail below.

At a step 120, N rows of data (where N equals Y original columns times Z original rows) are generated. Each of the N rows includes only one of the data values uniquely and respectively associated with the relevant portions of the header-column label information and with the header-row label information. The output of such a transformation is referenced by the numeral 1012 in FIG. 10. As can be seen in Table 1012, duplicative columns from the same table have been eliminated, and each row is associated with a unique data value.

Figure 2:
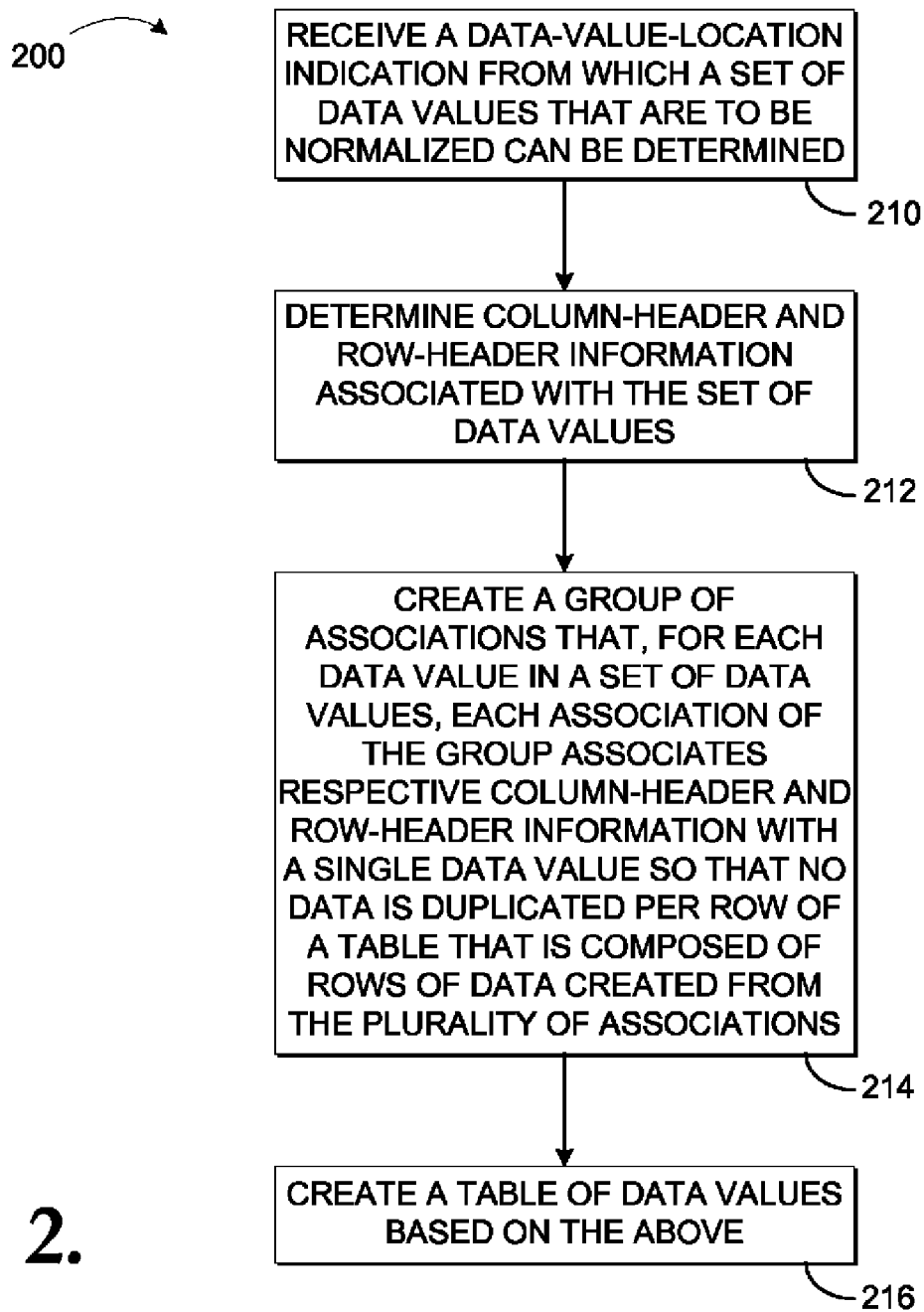

Turning now to FIG. 2, another illustrative method for conforming a dataset to first normal form is provided and referenced generally by the numeral 200. At a step 210, a data-value-location indication is received. Based on this indication, a set of data values that are to be normalized can be determined. For example, if the indication received was associated with Table 1010 of FIG. 10, then the location of numeral "10" would be received. Based on receiving this location, the application could progress rightward through the columns until encountering a null value (but such traversal would normally be made across the header row to prevent a case of an intermediate null value erroneously signaling an end of data), and the rows of data could be traversed downward to anticipate a location of a final data value. In the case of Table 1010, that final data value would be "37."

At a step 212, column-header and row-header information associated with the set of data values is determined. Thus, in this step the various states, countries, and dates can be stored for subsequent referential purposes. At a step 214, a group of associations is created. For each data value in a set of data values each association of the group associates respective column-header and row-header information with a single data value so that no data is duplicated per row of a table that is composed of rows of data created from the plurality of associations. Thus, with reference to Table 1010, an association such as "CA, USA, 1/1/2006, 10" is created. This association properly associates the respective state, country, and date with the data value "10." This process is repeated for each data value in the rows and columns previously mentioned.

If desired, a table of such data values based on the above can be created, as illustrated by step 216. Thus, in one embodiment, the associations themselves form the output. But in an additional aspect of the invention those associations can be used to generate a table such as Table 1012 that actually includes all of the data values.

Figure 3:
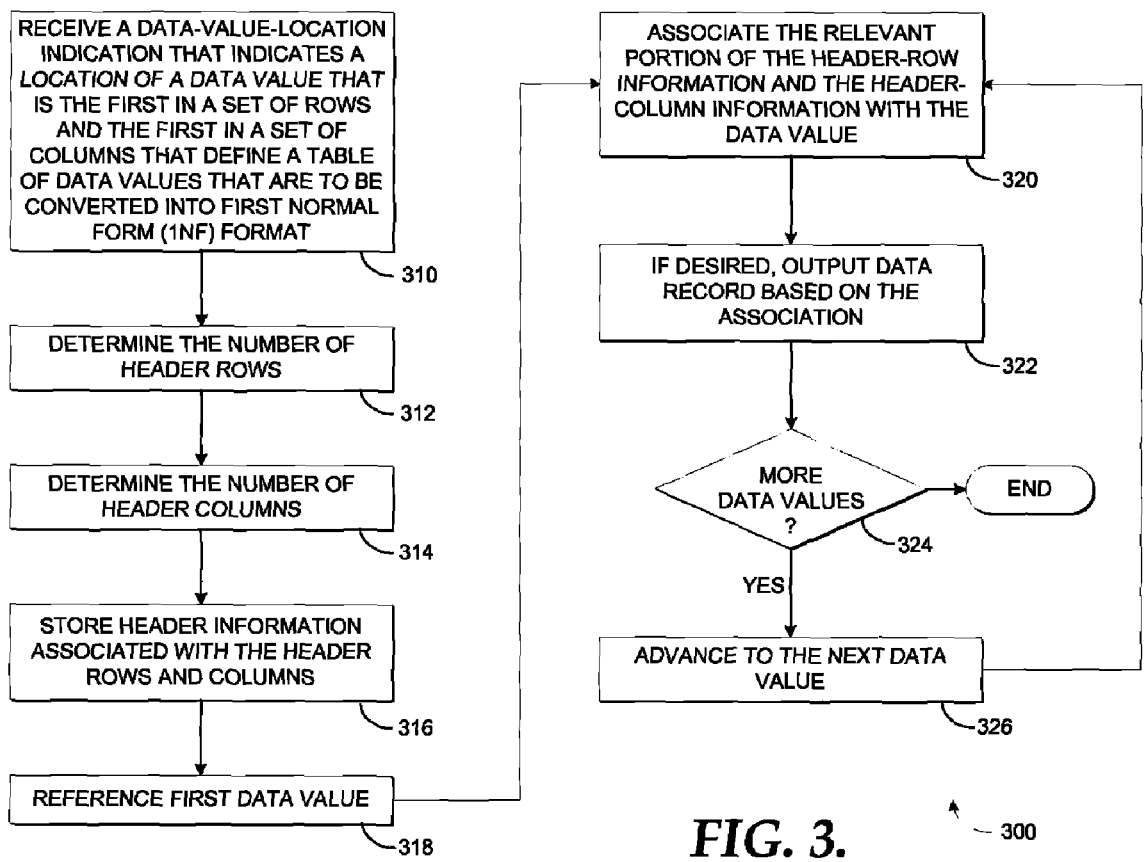

FIG. 3 depicts another illustrative method for practicing an embodiment of the present invention and is referenced generally by the numeral 300. At a step 310, a data-value-location indication is received that indicates a location of a data value that is the first in a set of rows and the first in a set of columns that define a table of data values that are to be converted into first normal form (or interchangeably referred to herein as being converted into 1NF format).

At a step 312, the number of header rows is determined. Similarly, at a step 314 the number of header columns is determined. At a step 316, header information associated with the header rows and the header columns is stored. At a step 318, the first data value is referenced. In one embodiment, this first data value is the data value stored in the data-value location of step 310. For example, with reference to Table 1010 of FIG. 10, this first data value would be "10."

At a step 320, the relevant portion of the header-row information and the header-column information is associated with the data value that is currently being referenced. If desired, data can be outputted in the form of a record based on the association of step 320. This step is referenced by numeral 322. At a step 324, a determination is made as to whether there are any more data values to be considered. For example, with reference to Table 1010 of FIG. 10, the last data value would be "37." This would be the case even if there were intermediary null values, as shown by Table 1110 of FIG. 11. Returning to FIG. 3, if there are more data values, then processing advances to a step 326 wherein the next data value is considered, and associations as previously discussed are made in step 320. The process continues until all data values have been considered.

Turning now to FIG. 4, a high-level overview of an embodiment of the present invention is provided. At a step 410, an indication of a source of data to be normalized into first normal form is received. In one embodiment, this indication can be received via a graphical user interface that denotes a range of data values to be normalized. For example, a user may indicate a first cell and a last cell that define the boundaries of a source of data. In an alternative embodiment, only the first cell needs to be disclosed because, as will be explained in greater detail below, and as briefly mentioned above, the boundaries of the dataset can be determined from an indication of the first data value in a dataset.

At a step 412, an input header type is determined. A first header type may be a header composed of only a single row of data. By way of illustration, another header type may be a header composed of two or more rows. This example is shown in FIG. 11.

At a step 414 output instructions can be received. Output instructions may indicate an output file that should receive the fruit of the normalization analysis. For example, a first output option would include a comma-separated variable or CSV file. A CSV file can be a text file and be virtually limitless in the number of rows of data that can be defined. Some spreadsheet applications are limited to the number of rows of data they can handle. But in some embodiments, a spreadsheet, or a portion of a workbook, or a portion of a spreadsheet can serve as the output reservoir for data that is normalized according to an embodiment of the present invention. The process is executed at a step 416, which will be explained in greater detail with reference to FIG. 5.

Turning now to FIG. 5, other aspects of a method for normalizing data according to an embodiment of the present invention is provided. Not all of these steps are necessary, as is the case with all flow diagrams in this disclosure. At a step 600, user input is validated. This process is described in greater detail with reference to FIG. 6. At a step 512, an indication is made as to whether header information is contained in either a single or multiple rows. It may be the case that header information is included in only a single row. It may be the case that header information takes the form of multiple rows. These cases can be handled somewhat differently.

At a step 700, the number of relevant columns of data in the dataset is determined. This process is explained in greater detail in FIG. 7. At a step 800, the number of relevant rows is determined. This process is explained in greater detail with reference to FIG. 8.

At a step 514, the variables for row- and column-header data are dimensioned. This means that the information in the header rows and columns can be stored for subsequent referential purposes. For instance, with reference to FIG. 10, the various dates in the header row as well as the various states and countries in the two header columns is stored.

At a step 516, the row-header data and the column-header data is actually collected. Thus, in one embodiment, dimensioning the variables may include only defining the number of values to be contained, whereas, in step 516, the header information is actually populated.

If only a single header row is involved, then processing can continue to a step 518, where a single-header path is selected. But if multiple header rows are implicated, then processing may continue to a step 520, wherein the application selects to execute a processing path associated with a double header. In either case, the output lines of data can be written at a step 900, which is illustratively shown in FIG. 9.

Figure 6:
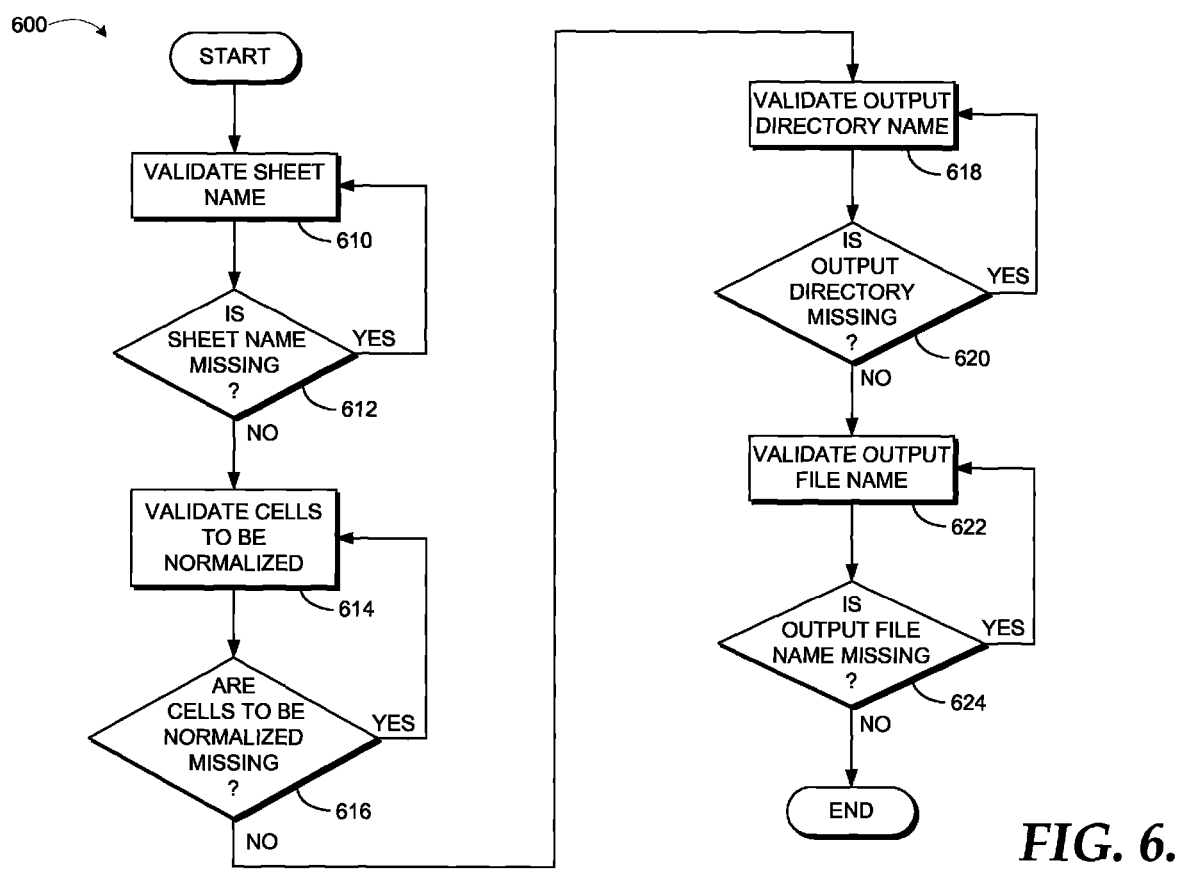
FIG. 6 is a flow chart that depicts a method for validating user input according to an embodiment of the present invention.

Turning now to FIG. 6, an illustrative process for validating user input is provided and referenced generally by the numeral 600. At a step 610, the file name or sheet name is validated if a spreadsheet or similar program is used. One way of validating such a name is to determine whether the sheet name is missing, as indicated by step 612. If it is, then processing reverts to 610 until a valid sheet name is provided. If not, processing advances to a step 614, wherein the cells to be normalized are validated. In one embodiment, this may include making a determination as to whether any cells are missing. If so, then processing reverts to a step 614, but, if not, then processing advances to a step 618, which validates a directory name associated with the output from the normalization process. In one embodiment this may include determining whether a file name, output directory, or other identifying indicia is missing. If it is, processing reverts to step 618, but, if not, processing advances to a step 622, where the output file name is validated.

The file name itself may be validated to ensure that it does not include any forbidden characters, as well as to ensure that a name is actually included for the embodiments that do not rely on the default file name. If an output file name is missing, then in one embodiment process reverts to step 622 but, although not shown, in another embodiment, a default file name is used. Although not explicitly shown in connection with other steps of FIG. 6, default sheet names and other values can be provided to even more fully automate the process and require no user intervention.

Turning now to FIG. 7, an illustrative process for determining a number of relevant columns is provided and referenced generally by the numeral 700. At a step 710, a determination is made as to whether an indication of a last column of data in a dataset was provided by a user. If so, the difference between that last column and the first column of data included in the dataset can be used to determine the number of relevant columns. Thus, for example, turning to Table 1010 of FIG. 10, the first column that includes data in the dataset to be normalized may be referred to as the "column 3." The last column of data may be "column 8." The inclusive difference between eight and three is six. Thus, the number of relevant columns containing data to be normalized is 6.

If an indication of the last column is not provided by a user, then processing continues to a step 712, where the columns with headers are counted starting from the column with the first data value to determine the number of relevant columns. Thus, continuing with the example above, the columns that include data information are counted, and the count would reach the same result: 6.

Turning now to FIG. 8, a similar process for determining the number of relevant rows of data in the dataset to be normalized is provided and referenced generally by the numeral 800. At a step 810, a determination is made as to whether the last row is provided by a user. If so, the difference between the first and last rows can be used to determine a count of the number of rows in the applicable dataset to have its format normalized into first normal form. This is referenced by step 814. But if an indication of a last row is not provided by a user, then processing advances to a step 812, where the number of rows are counted starting with the row containing the first data value and ending with the row having the last data value. Because it is possible that there may be a null value in the column containing the first data value, in one embodiment, the rows including column header information are counted. Thus, in the example of Table 1010, the rows containing country data or state data are counted to determine the number of rows in the dataset 1014.

Figure 9:
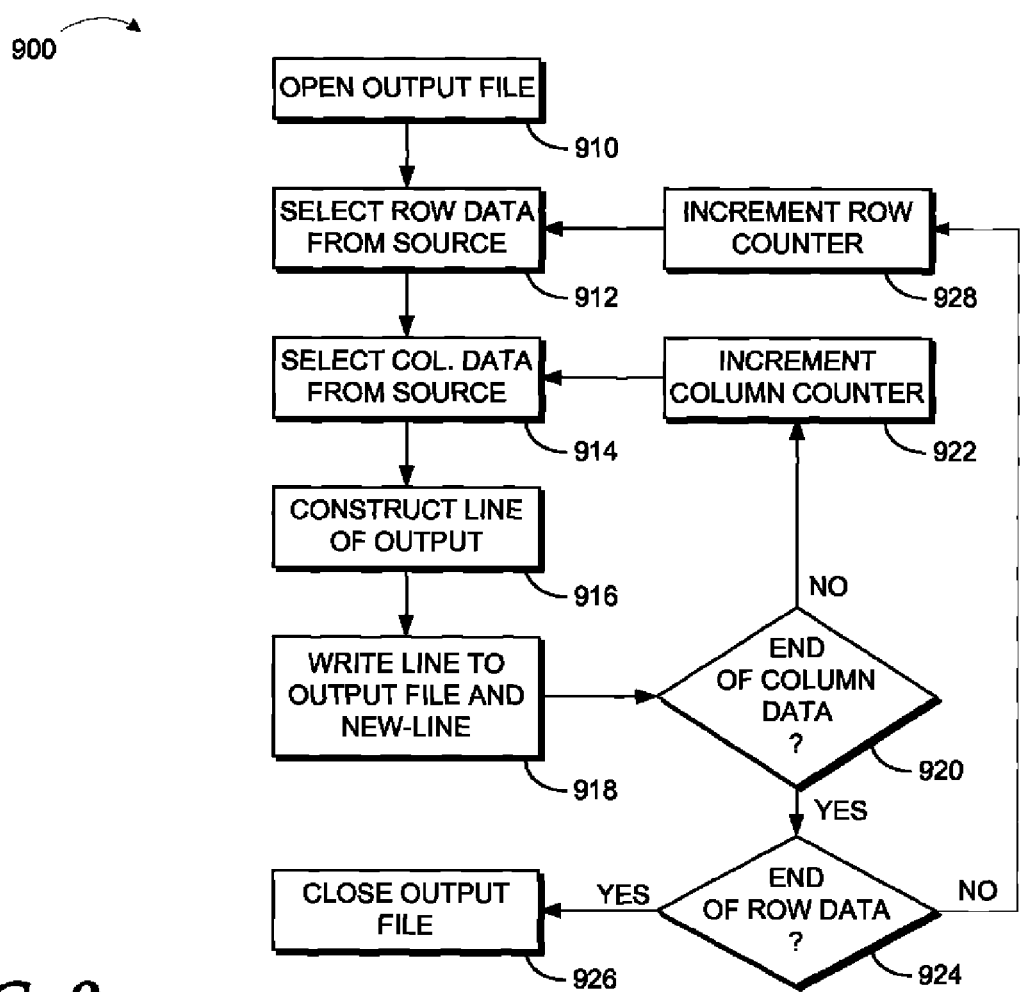
FIG. 9 depicts an illustrative process for generating output from a process that converts a dataset into a format consistent with first normal form.

Turning now to FIG. 9, an illustrative process for practicing an embodiment of the present invention is provided and referenced generally by the numeral 900. At a step 910, an output file to receive the output is opened. At a step 912, the row data is selected from the source data previously defined. At a step 914, the column data from the source data is selected. At a step 916, a line of output is constructed as previously mentioned. Thus, for example, with reference to Table 1010, a line of output indicated by numeral 1016 is constructed that is composed of "CA, USA, 1/1/2006, 10." The header values "CA" and "USA," could have been previously stored in some embodiments, and stored in such a way that they are indicated as associated with all data values of the first row. Similarly header value "1/1/2006" could have also been previously stored, and indicated as associated with all values in its respective column. Thus, when the time comes to write the output line, those previously stored header values can be referenced, and outputted to be associated with the respective data value.

A similar process to the above is carried out in connection with a data set associated with two or more header rows. Turning briefly to FIG. 11 for example, table 1110 includes two header rows. When the times comes to output a data row associated with value "1000" for example, then all header data will be referenced and outputted as associated with the value. Thus, row 1116, as shown, includes an indication of "Actual" as well as the date in connection with "1000." And this process repeats for all data values, and does so even though there is a null value (illustratively shown in row 1118).

Returning to FIG. 9, at a step 918, this line of data is written to the output file. A new line can be done at this point if desired. At a step 920, a determination is made as to whether the amount of column data in the specific row is exhausted. In the example of 1010, it would not be until the data value "15" was reached. Thus, processing would advance to a step 922, where the column counter is incremented and the loop defined by steps 914-918 would be repeated.

But if an end-of-column data was reached in step 920, then processing advances to a step 924, where a determination is made as to whether the end-of-row data had been reached. Assuming that only the first row of data had been completed, the answer to this inquiry would be no, and processing would advance to a step 928, where the row counter would be incremented to advance to the second row. After this process had exhausted all four rows of data, processing would advance to a step 926 wherein the output file could be closed in an embodiment of the present invention. In one embodiment, the present invention takes the form of a plug-in to a spreadsheet application, and data can be outputted to a different sheet in a workbook, or a different section of a common sheet.

Figure 10:
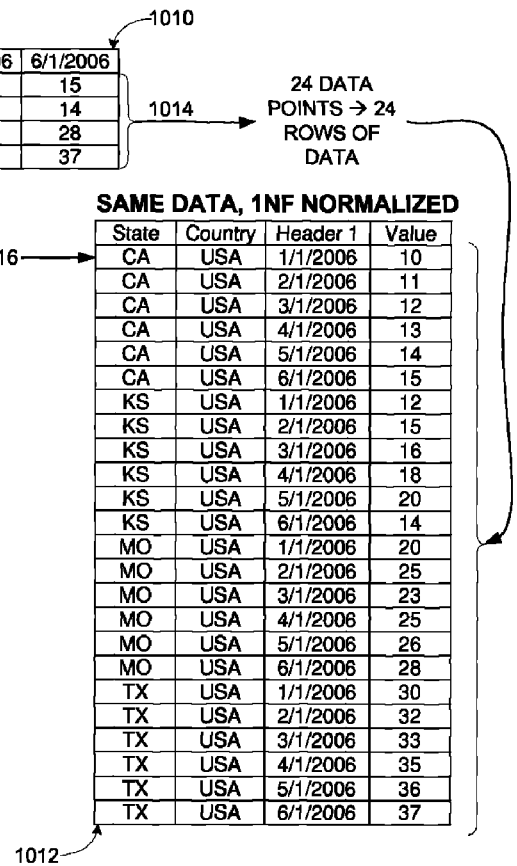
FIG. 10 depicts an illustrative table having one header row that is converted into a 1NF according to an embodiment of the present invention.

FIG. 10 has been described in connection with various processes previously mentioned.

FIG. 11 depicts an illustrative embodiment of an initial Table 1110 that includes two header rows. As can be seen, these two header rows are addressed in Table 1112 such that each data value in dataset 1114 is associated with only a single row of data in Table 1112. The number of header rows can be determined by starting at the indication of the first data item and traversing up a column of data until either a null value is reached or until the first row in a spreadsheet or table is reached. Similarly, the number of columns that make up header information can be determined by traversing leftward until either the first column in a spreadsheet application is reached or until a null value is reached. In this way, each data point can be analyzed and respective header information associated with that data point can be used to generate a line of data such that no duplicative columns are found in Table 1112.

Figure 12:
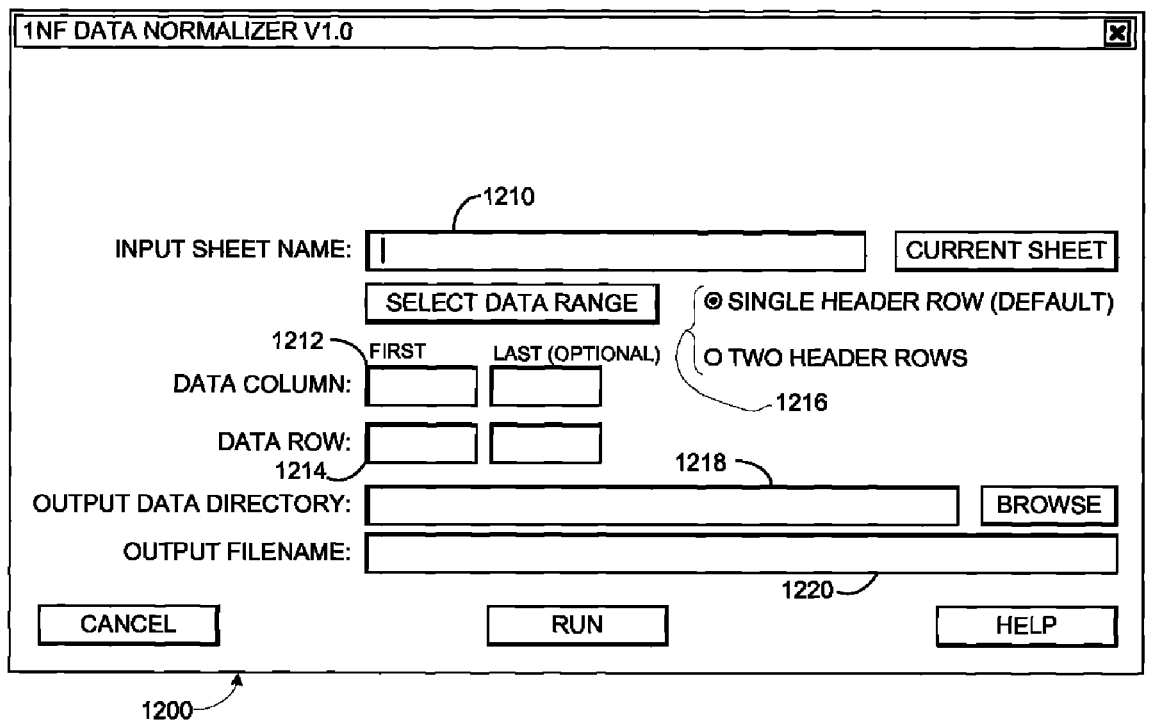
FIG. 12 is one purely illustrative user interface that might be used in connection with an embodiment of the present invention that utilizes such a user interface to receive user-provided data.

In some embodiments, a user may select a set of cells that define a dataset, or even a single cell that indicates a first data value in a dataset, and then execute the invention, which may be accomplished in some embodiments by selecting the option to execute a plug-in or add-in by way of a menu selection of a spreadsheet application. But in other embodiments, a graphical user interface may make it easier to receive user-entered data. An illustrative GUI is provided in FIG. 12, and referenced by the numeral 1200.

GUI 1200 illustratively includes text box 1210 to receive input that indicates a sheet name that includes the data set to be normalized. If desired, a starting column and starting row of the dataset can be indicated in boxes 1212 and 1214. Radio buttons 1216 provide a way to indicate whether two header rows are implicated or not. Of course, this data does not need to be affirmatively provided by user. As previously described, it can be determined by the methods stated above. An output directory and filename could also be provided in boxes 1218 and 1220.

Thus, in one embodiment, the invention will transform data arranged in a matrix (x rows by y columns) to a vertical array (x times y rows). For the start row, the first row that contains data can be specified. Column-header information can be assumed to be in the preceding row. If two rows of header information are present, this can be determined, or an indication of the "two header rows" radio button 1216 can be received. The two rows preceding the first data row will be used in such a case. For columns, the first column with data will be provided or determined. Everything before that column will be considered relevant information. Output can be to a comma-separated, plain-text file. Each cell of data is enclosed in quotes and fields are comma-separated.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more computer-readable storage media having computer-useable instructions embodied thereon for performing a method of manipulating one or more memories of a computing device that originally contained a dataset of multiple values per row in an array having Y rows and Z columns into one or more memories that store a single value per row in an array having Y*Z rows, the method comprising:

receiving an indication of a first data-value location containing a first data value of a set of data values to be normalized into first normal form, wherein the first data-value location is the most upper left data value in a matrix of data values having Y rows and Z columns that is bounded by a first row, a first column, a last row, and a last column;

determining a number of columns that contain data values based on the first data-value location;

determining a number of rows that contain data values based on the first data-value location;

determining a number of header rows that contain header-row label information based on the first data-value location;

determining a number of header columns that contain header-column label information based on the first data-value location; and based on the number of columns, the number of rows, the number of header rows, the number of header columns, the header-row information, and the header-column information, automatically generating N number of rows of data, wherein N=Y*Z, and further wherein each of N rows includes one of the data values uniquely and respectively associated with the header-column label information and with the header-row information.

2. The media of claim 1, wherein receiving said indication of said first data-value location includes receiving said indication by way of a graphical user interface (GUI).

3. The media of claim 1, wherein receiving said indication of said first data-value location includes receiving said indication by way of a selection of a cell in a spreadsheet program.

4. The media of claim 1, wherein determining the number of columns that contain data values includes counting a number of columns that contain header data starting with a column associated with the first data-value location.

5. The media of claim 1, wherein determining the number of columns that contain data values includes determining a last column that includes a data value, and determining a difference between said last column and a column associated with said first data-value location.

6. The media of claim 5, wherein determining said last column includes determining a final column that contains header information.

7. The media of claim 1, wherein determining the number of rows that contain data values includes counting a number of rows that include header-row data starting with a row that includes said first data-value location.

8. The media of claim 1, wherein determining the number of rows that contain data values includes determining a final row that includes data values, and determining a difference between said final row and a row that includes said first data-value indication.

9. The media of claim 8, wherein determining said final row includes determining which row is the last row to contain header-row information.

10. The media of claim 1, wherein generating said N rows of data includes storing row-header information and column-header information for subsequent retrieval in connection with each of said data values.

11. An application plug-in stored in memory that utilizes the computer-useable instructions of claim 1.

12. A spreadsheet application that includes the computer-useable instructions of claim 1.

13. One or more computer-readable media having computer-useable instructions embodied thereon for performing a method of manipulating one or more memories of a computing device that originally contained a dataset of multiple values per row in an array having Y rows and Z columns into one or more memories that store a single value per row in an array having Y*Z rows, the method comprising:

receiving an indication of a first data-value location containing a first data value of a set of data values to be normalized into first normal form, wherein the first data-value location is the most upper left data value in a matrix of data values having Y rows and Z columns that is bounded by a first row, a first column, a last row, and a last column;

determining a number of columns that contain data values based on a difference between a location of the last column and a location of the first column;

determining a number of rows that contain data values based on a difference between a location of the last row and a location of the first row;

determining a number of header rows that contain header-row label information based on the first data-value location;

determining a number of header columns that contain header-column label information based on the first data-value location; and based on the number of columns, the number of rows, the number of header rows, the number of header columns, the header-row information, and the header-column information, automatically generating N number of rows of data, wherein N=Y*Z, and further wherein each of N rows includes one of the data values uniquely and respectively associated with the header-column label information and with the header-row information.

14. The media of claim 13, wherein receiving said indication of said first data-value location includes receiving said indication by way of a graphical user interface (GUI).

15. The media of claim 1, wherein receiving said indication of said first data-value location includes receiving said indication by way of a selection of a cell in a spreadsheet program.

16. The media of claim 1, wherein generating said N rows of data includes storing row-header information and column-header information for subsequent retrieval in connection with each of said data values.

17. An application plug-in stored in memory that utilizes the computer-useable instructions of claim 13.

18. A spreadsheet application that includes the computer-useable instructions of claim 13.

* * * * *